(12) United States Patent
Lacy

(10) Patent No.: US 10,139,501 B2
(45) Date of Patent: Nov. 27, 2018

(54) BORON COATED STRAWS FOR NEUTRON DETECTION WITH PIE-SHAPED CROSS-SECTION

(71) Applicant: Proportional Technologies, Inc., Houston, TX (US)

(72) Inventor: Jeffrey L. Lacy, Houston, TX (US)

(*) Notice: Subject to any disclaimer, the term of this patent is extended or adjusted under 35 U.S.C. 154(b) by 0 days.

(21) Appl. No.: 15/787,497

(22) Filed: Oct. 18, 2017

(65) Prior Publication Data

US 2018/0106912 A1    Apr. 19, 2018

Related U.S. Application Data

(60) Provisional application No. 62/409,588, filed on Oct. 18, 2016, provisional application No. 62/414,321, filed on Oct. 28, 2016.

(51) Int. Cl.
| | |
|---|---|
| *G01T 1/36* | (2006.01) |
| *G01T 1/24* | (2006.01) |
| *H01J 47/12* | (2006.01) |
| *G01T 3/00* | (2006.01) |
| *G01T 3/08* | (2006.01) |

(52) U.S. Cl.
CPC .............. *G01T 1/249* (2013.01); *G01T 1/36* (2013.01); *G01T 3/006* (2013.01); *G01T 3/008* (2013.01); *G01T 3/085* (2013.01); *H01J 47/1205* (2013.01); *H01J 47/1222* (2013.01)

(58) Field of Classification Search
CPC .......... G01T 3/00; G01T 3/008; G01T 1/249; G01T 1/36; G01T 3/006; G01T 3/085; H01J 47/1205; H01J 47/1222
See application file for complete search history.

(56) References Cited

U.S. PATENT DOCUMENTS

| | | | |
|---|---|---|---|
| 2,443,731 A * | 6/1948 | Herzog | G01V 5/107 250/265 |
| 3,860,845 A | 1/1975 | Gleason et al. | |
| 7,002,159 B2 * | 2/2006 | Lacy | G01T 1/185 250/390.01 |
| 7,964,852 B2 | 6/2011 | McCormick | |
| 8,330,116 B2 | 12/2012 | Lacy | |
| 8,519,350 B2 | 8/2013 | McGregor et al. | |
| 8,569,710 B2 | 10/2013 | Lacy | |
| 8,907,293 B2 | 12/2014 | Lacy | |

(Continued)

OTHER PUBLICATIONS

J.L. Lacy, et al, "The Evolution of Neutron Straw Detector Applications in Homeland Security", IEEE Transactions on Nuclear Science, Apr. 2013, vol. 60, No. 2, pp. 1140-1146.

*Primary Examiner* — David Porta
*Assistant Examiner* — Faye Boosalis
(74) *Attorney, Agent, or Firm* — Hasley Scarano, L.L.P.

(57) ABSTRACT

A boron coated straw detector for use in a neutron detection system is disclosed comprising a boron coated straw having at least one boron-coated septum radially oriented and extending a pre-determined distance towards the center of the straw. Preferably, the straw comprises a plurality of septa comprising a rigid surface, coated on both sides with a boron composition. Preferably, the septa run the length of the straw detector from one end of the straw to the other. The area coated on the septa adds to the area coated on the arc segments offering a significant benefit in sensitivity of the neutron detector.

21 Claims, 8 Drawing Sheets

(56) References Cited

U.S. PATENT DOCUMENTS

| | | | |
|---|---|---|---|
| 8,941,075 B2 | 1/2015 | Lacy | |
| 9,213,111 B2 | 12/2015 | Lacy | |
| 9,218,946 B2 | 12/2015 | Lacy | |
| 9,281,153 B1 * | 3/2016 | Wedding | H01J 47/008 |
| 2003/0188637 A1 * | 10/2003 | Ito | B01D 53/22 |
| | | | 96/108 |
| 2005/0205798 A1 | 9/2005 | Downing et al. | |
| 2010/0258734 A1 | 10/2010 | McCormick et al. | |
| 2011/0272570 A1 | 11/2011 | Xu et al. | |
| 2012/0217406 A1 * | 8/2012 | McGregor | G01T 3/00 |
| | | | 250/361 R |
| 2014/0110247 A1 | 4/2014 | Lacy | |
| 2014/0110593 A1 | 4/2014 | Lacy | |

* cited by examiner

BORON COATED STRAWS FOR NEUTRON DETECTION WITH PIE-SHAPED CROSS-SECTION

RELATED APPLICATIONS

This application claims priority to U.S. Provisional Application Nos. 62/409,588 ("the '588 application") filed Oct. 18, 2016, and 62/414,321 filed Oct. 28, 2016 ("the '321 application"). The '588 and '321 applications are hereby incorporated by reference in there entirety for all purposes, including but not limited to, all portions describing the straw manufacturing process and equipment of the present invention and the embodiments disclosed, those portions describing boron-coated straw detectors in general as background and for use with specific embodiments of the present invention, and those portions describing other aspects of manufacturing and testing of boron-coated straws that may relate to the present invention.

GOVERNMENTAL SPONSORSHIP

This invention was made with support under HDTRA-1-14-C-0047 awarded by the Defense Threat Reduction Agency. The government may have certain rights in the invention.

REFERENCE TO A SEQUENTIAL LISTING

Not applicable.

BACKGROUND OF THE INVENTION

Field of the Invention

This invention relates to manufacturing neutron detectors. More particularly, this invention relates to boron-coated straw detectors having internal, radial oriented septa which provide a pie-shaped cross sectional appearance.

Description of the Related Art

Boron-coated straw detector technology was first patented by Dr. Lacy in U.S. Pat. No. 7,002,159 entitled "Boron-Coated Straw Neutron Detector" based upon a Nov. 13, 2002, filing. As the thought leader of this technology area, Dr. Lacy continued his research and development to improve the boron coated straw detectors technology and to find new uses. Examples of Dr. Lacy's continued progress in this technology area are found in his other issued patents and pending patent applications which include: U.S. Pat. No. 8,330,116 entitled "Long Range Neutron-Gamma Point Source Detection and Imaging Using Rotating Detector"; U.S. Pat. No. 8,569,710 entitled "Optimized Detection of Fission Neutrons Using Boron-Coated Straw Detectors Distributed in Moderator Material"; U.S. Pat. No. 8,907,293, entitled "Optimized Detection of Fission Neutrons Using Boron-Coated Straw Detectors Distributed in Moderator Material"; U.S. Pat. No. 9,218,946 entitled "Sealed Boron-Coated Straw Detectors"; U.S. Pat. No. 9,213,111 entitled "Neutron Detectors for Active Interrogation"; U.S. Pat. No. 8,941,075, entitled "Boron Coated Straw Detectors with Shaped Straws"; U.S. patent application Ser. No. 14/060,015 filed Oct. 22, 2013, entitled "Method and Apparatus for Coating Thin Foil with a Boron Coating" (Notice of Allowance Issued); U.S. patent application Ser. No. 14/938,903 filed Nov. 12, 2015 entitled "Method of Accurate Thickness Measurement of Boron Carbide Coatings on Copper Foil" (Issue Fee Paid); U.S. patent application Ser. No. 14/939,296 filed Nov. 12, 2015, entitled "Moving Magnet Assembly to Increase the Utility of a Rectangular Magnetron Sputtering Target"; and U.S. patent application Ser. No. 15/603,233 filed May 23, 2017, entitled "Method of Manufacturing Boron Coated Straws for Neutron Detection Through Spiral Winding and Welding." The patents and pending applications mentioned in this paragraph are hereby incorporated by reference in their entirety for all purposes, including but not limited to those portions describing the structure and technical details of the boron-coated straw detectors and boron coating as background and for use as specific embodiments of the present invention, and those portions describing other aspects of manufacturing and testing of boron-coated straws that may relate to the present invention.

Dr. Lacy also widely published articles on boron-coated straw detection capabilities, fabrication, and development of prototypes for various applications including:

J. L. Lacy, et al, "Novel neutron detector for high rate imaging applications", *IEEE Nuclear Science Symposium Conference Record*, 2002, vol. 1, pp. 392-396;

J. L. Lacy, et al, "Straw detector for high rate, high resolution neutron imaging", in *IEEE Nuclear Science Symposium Conference Record*, 2005, vol. 2, pp. 623-627;

J. L. Lacy, et al, "High sensitivity portable neutron detector for fissile materials detection", *IEEE Nuclear Science Symposium Conference Record*, 2005, vol. 2, pp. 1009-1013;

J. L. Lacy, et al, "Performance of 1 Meter Straw Detector for High Rate Neutron Imaging", *IEEE Nuclear Science Symposium Conference Record*, 2006, vol. 1, pp. 20-26;

J. L. Lacy, et al, "Long range neutron-gamma point source detection and imaging using unique rotating detector", *IEEE Nuclear Science Symposium Conference Record*, 2007, vol. 1, pp. 185-191;

J. L. Lacy, et al, "Fabrication and materials for a long range neutron-gamma monitor using straw detectors", *IEEE Nuclear Science Symposium Conference Record*, 2008, pp. 686-691;

J. L. Lacy, et al, "One meter square high rate neutron imaging panel based on boron straws", *IEEE Nuclear Science Symposium Conference Record*, 2009, pp. 1117-1121;

J. L. Lacy, et al, "Boron coated straw detectors as a replacement for $^3$He", *IEEE Nuclear Science Symposium Conference Record*, 2009, pp. 119-125;

J. L. Lacy, et al, "One meter square high rate neutron imaging panel based on boron straws", *IEEE 2009 Nuclear Science Symposium Conference Record*, 2009, pp. 1117-1121;

J. L. Lacy, et al, "Initial performance of large area neutron imager based on boron coated straws", *IEEE 2010 Nuclear Science Symposium Conference Record*, 2010, pp. 1786-1799;

J. L. Lacy, et al, "Initial performance of sealed straw modules for large area neutron science detectors", *IEEE 2011 Nuclear Science Symposium Conference Record*, 2011, pp. 431-435;

J. L. Lacy, et al, "Straw-Based Portal Monitor $^3$He Replacement Detector with Expanded Capability", *IEEE 2011 Nuclear Science Symposium Conference Record*, 2011, pp. 431-435;

J. L. Lacy, et al, "Performance of a Straw-Based Portable Neutron Coincidence/Multiplicity Counter", *IEEE 2011 Nuclear Science Symposium Conference Record*, 2011, pp. 529-532;

J. L. Lacy, et al, "Replacement of $^3$He in Constrained-Volume Homeland Security Detectors", *IEEE 2011 Nuclear Science Symposium Conference Record*, 2011, pp. 324-325;

J. L. Lacy, et al, "Initial performance of sealed straw modules for large area neutron science detectors", *IEEE 2011 Nuclear Science Symposium Conference Record*, 2011, pp. 431-435;

J. L. Lacy, et al, "Boron-coated straws as a replacement for 3He-based neutron detectors", *Nuclear Instruments and Methods in Physics Research*, Vol. 652, 2011, pp. 359-363;

J. L. Lacy, et al, "Design and Performance of High-Efficiency Counters Based on Boron-Lined Straw Detectors", *Institute of Nuclear Materials Management Annual Proceedings*, 2012;

J. L. Lacy, et al, "Boron-coated straw detectors of backpack monitors", *IEEE Transactions on Nuclear Science*, Vol. 60, No. 2, 2013, pp. 1111-1117.

J. L. Lacy, et al, "The Evolution of Neutron Straw Detector Applications in Homeland Security", *IEEE Transactions on Nuclear Science*, Vol. 60, No. 2, 2013, pp. 1140-1146.

The publications mentioned in this paragraph are hereby incorporated by reference in their entirety for all purposes, including but not limited to those portions describing the structure and technical details of the boron-coated straw detectors and boron coatings as background and for use as specific embodiments of the present invention, and those portions describing other aspects of manufacturing and testing of boron-coated straws that may relate to the present invention.

The boron-coated straw (BCS) detector is based on arrays of thin walled boron-coated metal (preferably copper) tubes. The elemental component of this detector is a long tube ("straw") coated on the inside with a thin layer of $^{10}$B-enriched boron carbide ($^{10}$B$_4$C). Thermal neutrons captured in $^{10}$B are converted into secondary particles, through the $^{10}$B(n,α) reaction:

$$^{10}B + n \rightarrow ^7Li + \alpha \tag{1}$$

The $^7$Li and α particles are emitted isotropically in opposite directions with kinetic energies of 1.47 MeV and 0.84 MeV, respectively (dictated by the conservation of energy and momentum). For a boron carbide layer that is only about 1 μm thick, one of the two charged particles will escape the wall 78% of the time, and ionize the gas contained within the straw.

Each BCS detector is operated as a proportional counter, with its wall acting as the cathode, and a thin wire tensioned through its center serving as the anode electrode, operated at a high positive potential. Primary electrons liberated in the gas drift to the anode, and in the high electric field close to the anode, avalanche multiplication occurs, delivering a very much amplified charge on the anode wire. Standard charge-sensitive preamplifier and shaping circuitry are used to produce a low noise pulse for each neutron event. Gamma interactions in the wall produce near minimum ionizing electrons that deposit a small fraction of the energy of the heavily ionizing alpha and Li products. Gamma signals are effectively discriminated with a simple pulse height threshold.

In order for neutrons stopped in the straw array to be detected, the decay fragments must escape the thin layer of $^{10}$B$_4$C in each straw. The escape probability can be derived from the solid angle formed between the point of neutron interaction and the exit interface, and is written as:

$$\varepsilon_{esc} = 1 - T/(4L_\alpha) - T/(4L_{Li}), \quad \text{for } T \leq L_{Li} \tag{2a}$$
$$= 1/2 + L_{Li}/(4T) - T/L_\alpha, \quad \text{for } L_{Li} < T \leq L_\alpha \tag{2b}$$
$$= (L_\alpha + L_{Li})/(4T), \quad \text{for } T > L_\alpha \tag{2c}$$

where T is the film thickness, and $L_\alpha$ and $L_{Li}$ are the ranges of the α and $^7$Li, respectively, inside the $^{10}$B$_4$C film, equal to $L_\alpha$=3.30 μm and $L_{Li}$=1.68 μm. The ranges were computed in SRIM-2006.02 (http://www.srim.org/) for a target layer of $^{10}$B$_4$C with a density of 2.38 g/cm$^3$ and for ion energies of 1.47 MeV for alphas and 0.84 MeV for $^7$Li. The escape efficiency computed here is slightly underestimated, because for simplicity we only considered the dominant branch of the $^{10}$B(n,α) reaction. The other branch (6% of cases) generates more energetic products, which have slightly better chances for escape. For a $^{10}$B$_4$C film thickness of 1.0 μm, the escape efficiency is 78%.

The boron-coated straw neutron detection technology has become an attractive $^3$He neutron detection system replacement solution in a series of applications in homeland security, neutron science, and safeguards.

SUMMARY OF THE INVENTION

An improved boron coated straw detector is disclosed comprising a boron coated straw having at least one boron-coated septum radially oriented and extending a pre-determined distance towards the center of the straw. Preferably, the straw comprises a plurality of septa comprising a rigid surface, coated on both sides with a boron composition. Preferably, the septa run the length of the straw detector from one end of the straw to the other. The area coated on the septa adds to the area coated on the are segments offering a significant benefit in sensitivity of the neutron detector. The improved boron coated straw detectors may be formed together into a panel of straws and the panel may be attached to a wearable vest for easy portable neutron detection system. In preferred embodiments, multiple panels of improved straw detectors are utilized. The improved straw detectors may also be utilized to form small neutron detection systems of a size that can be comfortably held by a hand.

Additional advantages of the invention are set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF SEVERAL VIEWS OF THE DRAWINGS

A better understanding of the invention can be obtained when the detailed description set forth below is reviewed in conjunction with the accompanying drawings, in which.

DETAILED DESCRIPTION OF VARIOUS EMBODIMENTS OF THE INVENTION

An improved boron coated straw detector is disclosed comprising a boron coated straw having at least one boron-coated septum radially oriented and extending a pre-determined distance towards the center of the straw. Preferably, the straw comprises a plurality of septa comprising a rigid surface, coated on both sides with a boron composition. Preferably, the septa run the length of the straw detector from one end of the straw to the other. The area coated on the septa adds to the area coated on the arc segments offering a significant benefit in sensitivity of the neutron detector.

Figure 1:
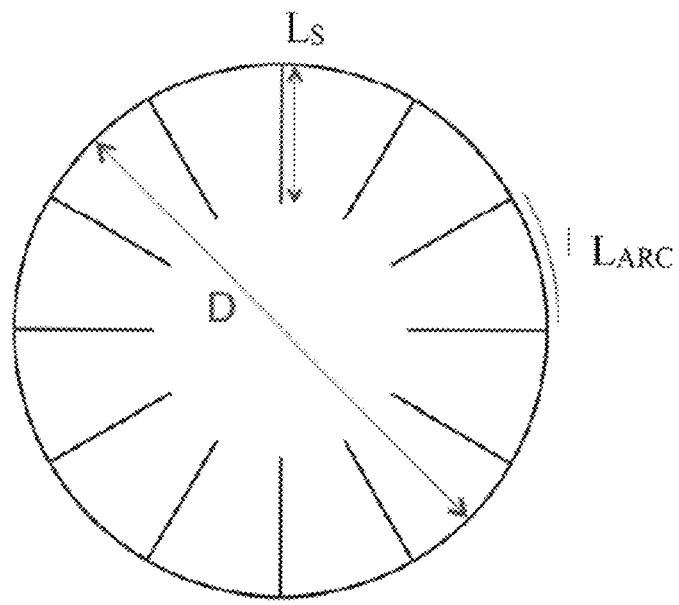
FIG. 1 depicts a cross-sectional view of an embodiment of a straw having 12 septa.

In order to improve the neutron detection efficiency of the boron-coated straw detectors, while maintaining manufacturability, the structure of the conventional straw has been modified to provide significant performance benefits. The cross-section of the improved straw design has a pie-like shape as shown in FIG. 1. As will now be recognized by those of skill in the art, the pie-like shape cross-section straws consists of any desired number of arc segments, and an equal number of septa walls, which are radially oriented, and extending a desired distance towards the center of the geometry. Each septum is preferably a segment of the wall that has been collapsed onto itself, resulting in a rigid surface, coated on both sides. Preferably, the septa run the entire length of the straw such that the pie-shaped cross-section can be found anywhere along the length of the straw. This maintains the increased coated area along the entire length and avoids non-uniformities in the electric field that could result from discontinuities in the septa. The area coated on the septa is added to the area coated on the arc segments, thus offering a significant benefit in sensitivity of the neutron detector. For example, compared to a round straw of the same diameter, the coated wall area of the 12-septa pie shape of FIG. 1 is three times larger, assuming the septa are equal in length to each of the arc segments, as may be preferred. Further, a single 0.128 inch ID straw tube with 12 septa can produce the same neutron sensitivity as the same tube filled with 10 atmospheres pressure $^3$He for traditional detectors, if those detectors were able to function at such small diameters.

The wall area benefit of the improved boron coated straw design can be calculated analytically, as discussed next. Referring to FIG. 1, the wall perimeter of this pie-like shape can be written as $P=\pi D+2N_s$, where D is the outer diameter, N is the number of septa (N=12 in the figure), and Ls is the length of the septum wall. Now, assume Ls can be expressed as a fraction of the arc length $L_{arc}$, such that $L_s=f \cdot L_{arc}$, and that $L_{arc}=\pi D/N$. The fraction f is bounded by $0 \leq f \leq N/(2\pi)$, where this limit ensures that the septum length $L_s$ is less than the circle radius, $L_s \leq D/2$. As an example, for N=6, f≤0.95; for N=12, f≤1.9; and so forth. In practice, LA is preferably not much greater than about D/4, since long septa result in very low electric fields near the outer wall, as discussed in the next section. The ratio of perimeters can now be written as $R=P/(\pi D)$, and substituting for the relations given above, we can simply write R=1+2f. Thus, R is only a function of the factor f, and does not depend on the outer diameter D. The maximum value of R depends on N, and is given by $R_{max}=+N/\pi$. For the case of the round straw with no septa, for instance, f=0 and R=1.0. For f=0.5, the ratio is R=2, and for f=1.0, the ratio is R=3.0.

Pie Straw Geometry Examples:

Round Straw Perimeter: $P_{round} = \pi \cdot D$

Pie Straw Perimeter:

$$P_{pie} = \pi \cdot D + 2 \cdot N \cdot L_s$$
$$= \pi \cdot D + 2 \cdot N \cdot f \cdot L_{arc}$$
$$= \pi \cdot D \cdot (1 + 2 \cdot f)$$

Where D=straw diameter, N=number of septa, Ls=length of septa, f=ratio septa/arc length, and $L_{arc}$=length of arc. Boron Content Ratio: $P_{pie}/P_{round}$, R=1+2·f.

For D=15 mm, N=6, f=0.5, then R=2.

For D=3.25 mm, N=12, f=1.0, then R=3.

Figure 2:
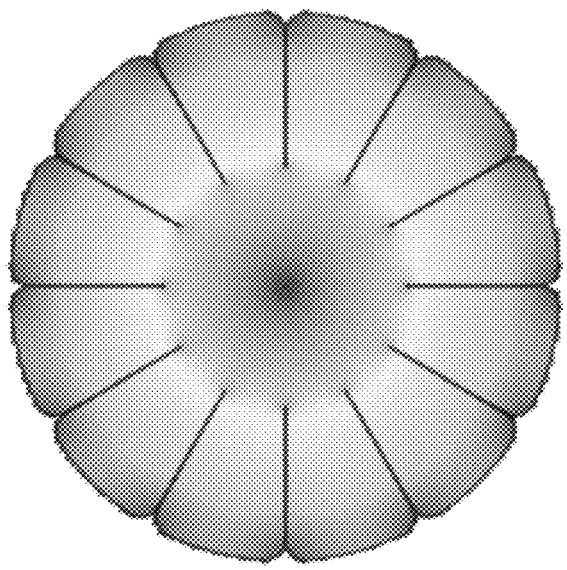
FIG. 2 depicts a 2D electric field map of the embodiment of FIG. 1.

The pie-shaped design should preferably maintain a sufficiently high electric field, to ensure short electron drift times and to prevent loss of ionization due to recombination. As shown in FIG. 2, a 2-dimensional electric field map was calculated for a 12-septa pie-shaped cross-section straw such as shown in FIG. 1, using numerical methods implemented in ELECTRO (Integrated Engineering Software), and assuming a bias of 1000 V, and D=4.43 mm. The field map of FIG. 2 is shown in grey scale that corresponds to different values of the field. The grey scale scaling is logarithmic. The minimum field level in this example is about 3.11 V/cm and occurs in the corners between arc and septa walls (darker grey). Preferably, these corners are rounded as shown (for example with a radius=0.1 mm) in order avoid very low field levels in those areas. The minimum field level required to prevent recombination and provide optimal signal risetime depends on the gas mixture used in the detector but for typical Argon/$CO_2$ mixtures is 1 Volt per cm.

Figure 4:
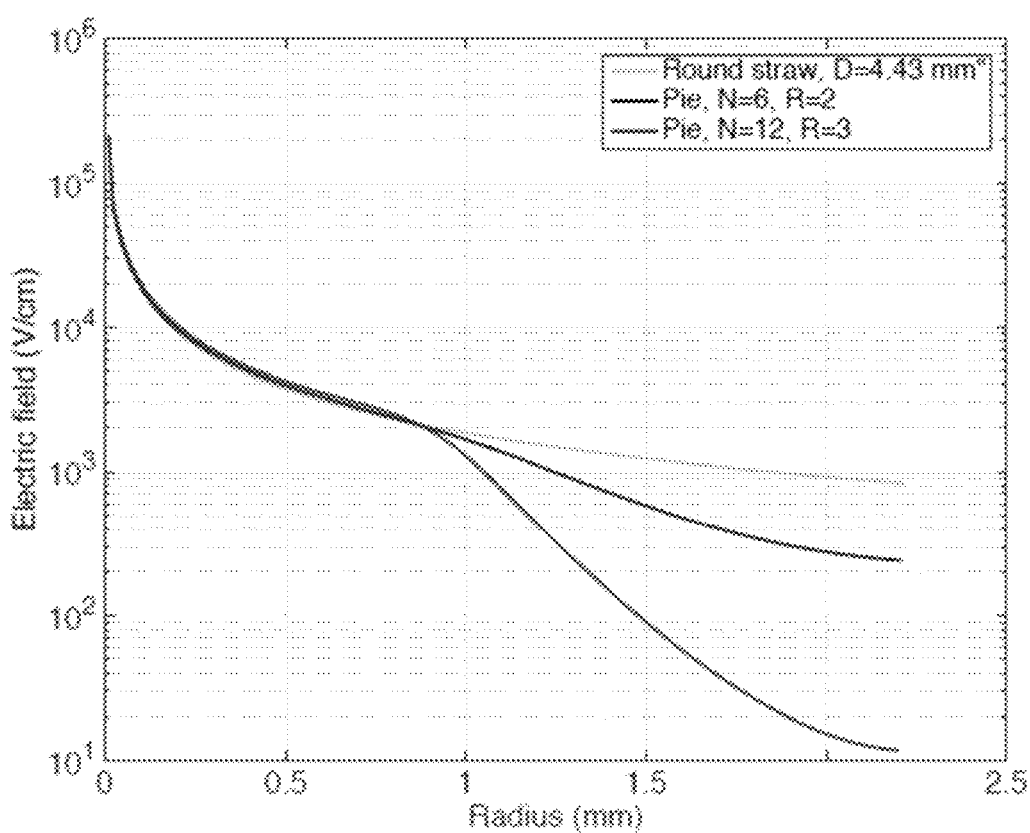
FIG. 4 depicts a graph of electric fields calculated for prior art round cross-sections and two embodiments with septa.

In the Electron Field Distribution Example of FIGS. 2 and 4, dimensions chosen to maintain high electric fields and ensure short electron drift times are as follows:

$\tau_{max}$<0.35 ms,
HV=1000 V,
Diameter=4.43 mm,
Blue=3.11 V/cm,
Red=2.3·10$^5$ V/cm.

Field drops inside the region between the septa, setting a practical limit to dimensions of about $L_s$<D/4 or f<N/(4·π). As will now be recognized by a person of skill in the art, the longer the septa the better in terms of efficiency, but there is a tradeoff in that longer septa result in a lower electric field, in the region in between septa, which slows down the drift of ionization generated in those regions. This may lead to a reduced detection efficiency. This sets the practical limit on the septa length. There is no minimum septa length in theory. Even very short septa would increase the sensitivity of the straw, but there is extra manufacturing effort to form the septa, even short ones, thus it is best to make then as long as possible, within the limits discussed above.

Figure 3:
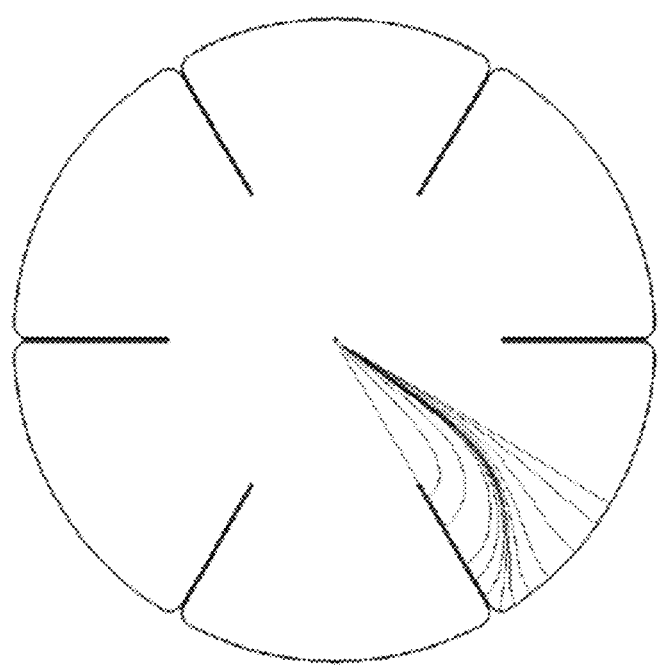
FIG. 3 depicts a cross-sectional view of an embodiment of a straw having 6 septa with streamlines showing the direction of the electric field along which electrons travel.

FIG. 3 illustrates some of the paths that electrons traverse when liberated at the corresponding locations near the wall in a 6 septa embodiment. Electrons liberated near the septa walls initially travel in a direction normal to the wall, then turn and follow a radial path to the anode wire. FIG. 4 plots the field level calculated along radii of two different pie shapes straws, and includes the analytical field of a round straw with the same diameter (about D=4.43 mm), for comparison. The first pie shaped straw example included 6 septa and an R=2. The second pie shaped straw example included 12 septa and an R=3. All fields are evaluated for a bias of 1000 V. Although the field drops significantly inside the region between the septa (radius>about 0.9 mm) for the pie shapes, it is more or less the same for all shapes in the middle part of the cross section, and at the wire (maximum), meaning that signal amplification, due to avalanching, will be similar in all.

Figure 5:
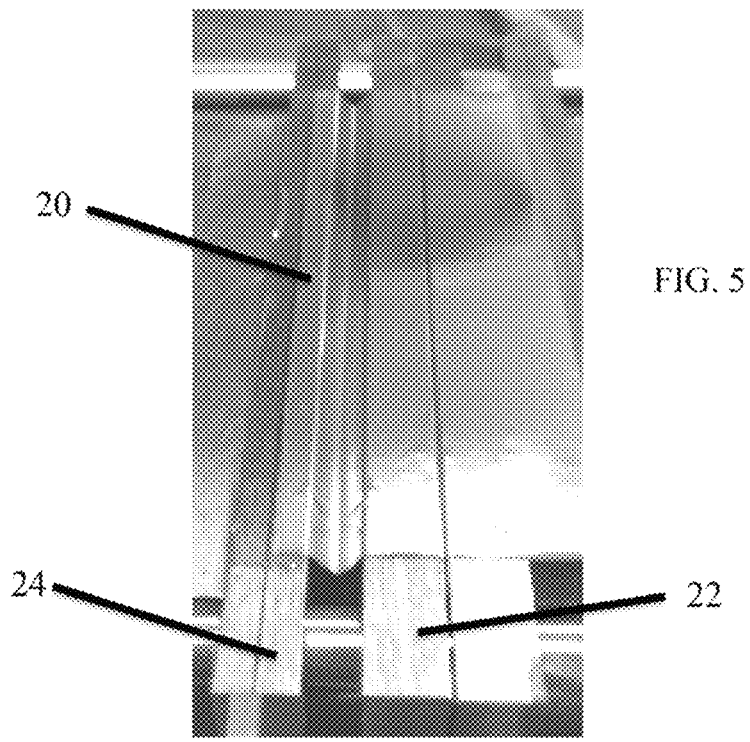
FIG. 5 depicts an embodiment of an apparatus that can be used to form septa walls on a boron-coated copper foil.
Figure 6:
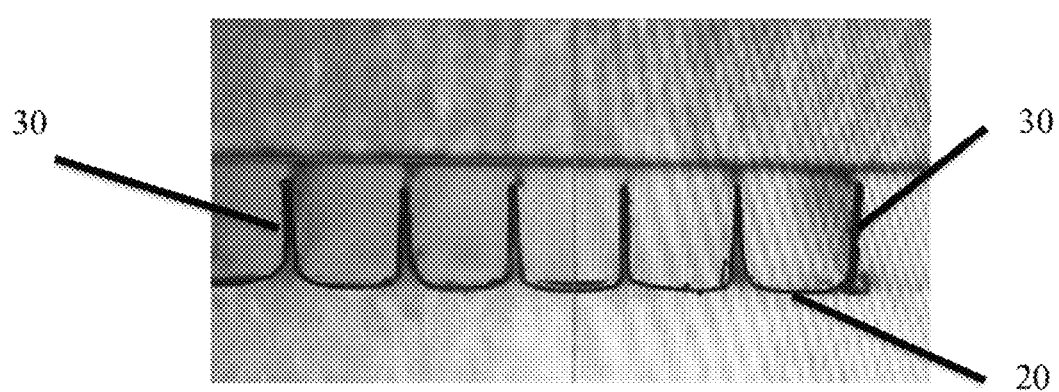
FIG. 6 depicts a microscope photograph of boron-coated foil following the formation of septa walls but prior to being rolled to form the pie-shaped straw detector.

One method of forming the septa in a pie-shape cross-section straw includes placing a layer of boron-coated foil 20 over a series of spaced precision bar stock 22, 24, as shown in FIG. 5. The foil 20 is preferably of a variety such as manufactured in accordance and/or disclosed in U.S. patent application Ser. No. 14/060,015 filed Oct. 22, 2013, entitled "Method and Apparatus for Coating Thin Foil with Boron Coating" (Notice of Allowance Received) which is incorporated herein by reference in its entirety for the purpose of disclosing preferred foil parameters. As will now be recognized by a person of skill in the art, the thickness of the bar stock 22, 24 utilized determines the arc length between septa and the spacing between the bar stock 22, 24 determines the septum length. Clamping the assembly together, the foil 20 can be collapsed between the bars 22 and 24, forming the series of extremely straight and stiff walled septa with boron coating on each side. FIG. 6 shows a microscopic side view showing the septa 30 formed on the foil 20 using the method of FIG. 5, before the foil 20 is rolled into a straw. Once removed from the forming station of FIG. 5, the foil 20 can then be rolled and inserted into the appropriate diameter containment tube for wiring, sealing, and gas filling such as is demonstrated, for example, in U.S. Pat. Nos. 7,002,159; 8,569,710; and 9,218,946, each of which is incorporated herein by reference in its entirety for this purpose.

Figure 11:
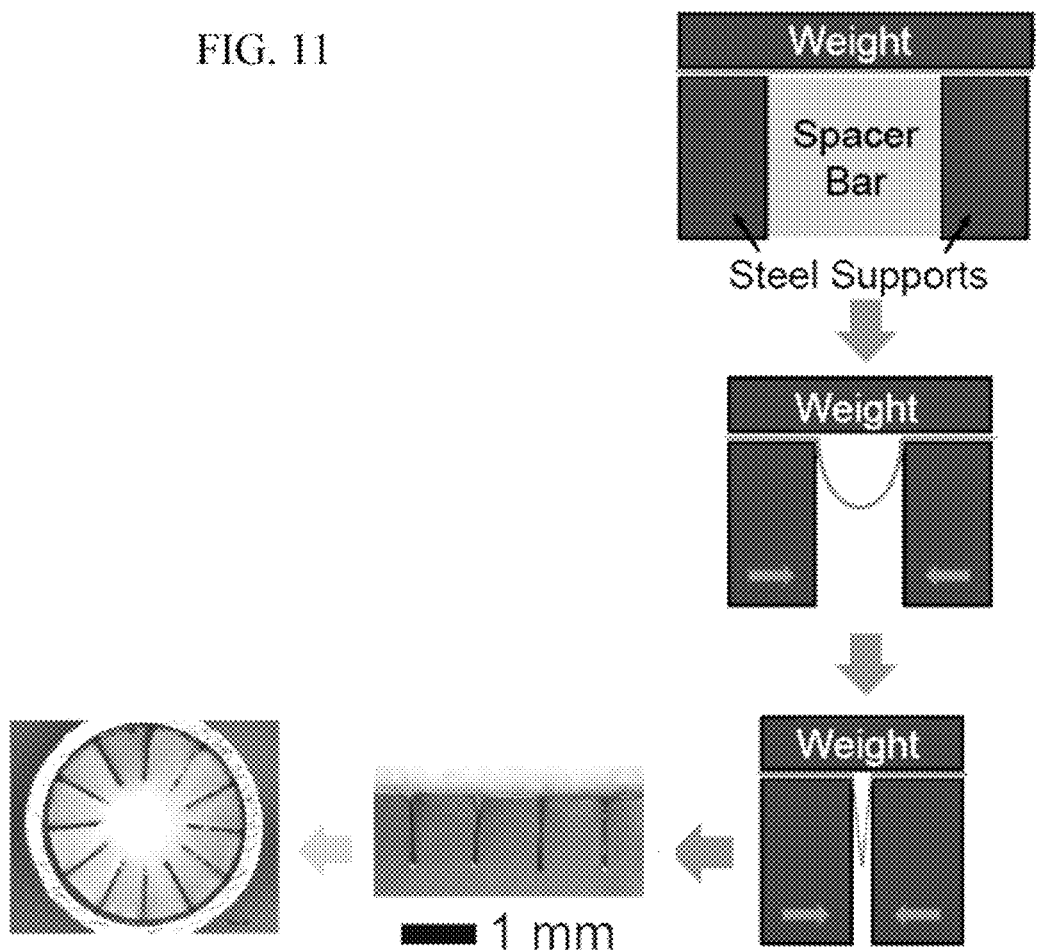
FIG. 11 depicts a series of steps that can be utilized in a process to manufacture the improved straws.
Figure 12:
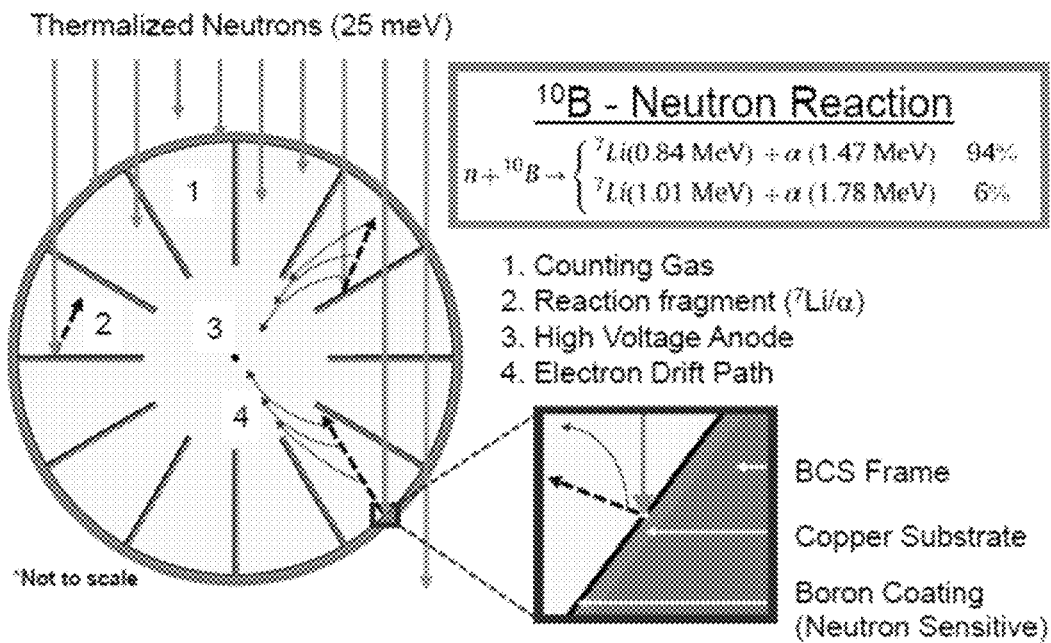
FIG. 12 depicts a representation of electrons would travel in an embodiment of a boron-coated straw detector.

FIG. 11 further depicts a series of steps that can be utilized in a method to manufacture the improved straws including the steps of: (1) providing a forming station comprising a plurality of forming bars (preferably steel or similar metal), a spacer bar, a cover weight, and a roll of boron covered foil; (2) utilizing the spacer bar to space the forming bars apart approximately 2 times the desired septa length ($L_s$); (3) placing the foil, coating side down, over the forming bars; (4) place the cover weight over the non-coated side of the foil to hold the foil in place; (5) moving the forming bars toward each other thereby collapsing the intermediate foil and forming a septa having coated walls on both sides; (6) removing the foil with septa from the forming station; (7) rolling the foil into a straw having the septa radiating in the interior of the straw; and (8) inserting the rolled straw into a containment tube.

Figure 7:
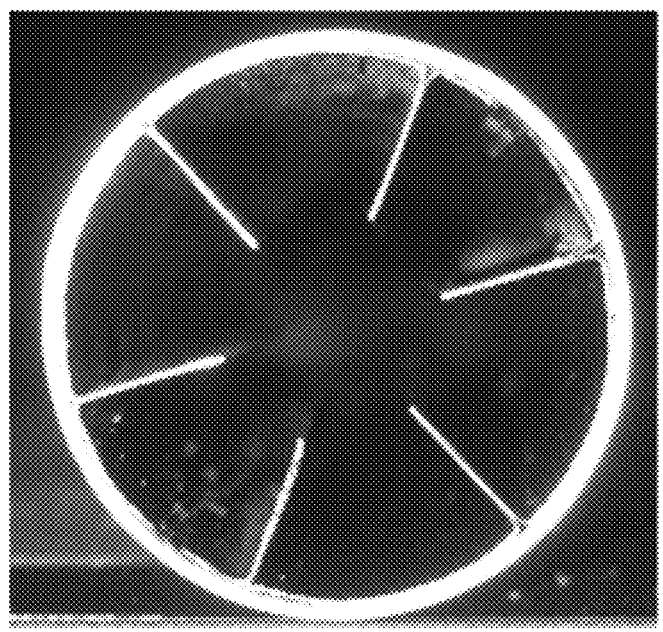
FIG. 7 depicts a cross-section of an embodiment having six septa.
Figure 8:
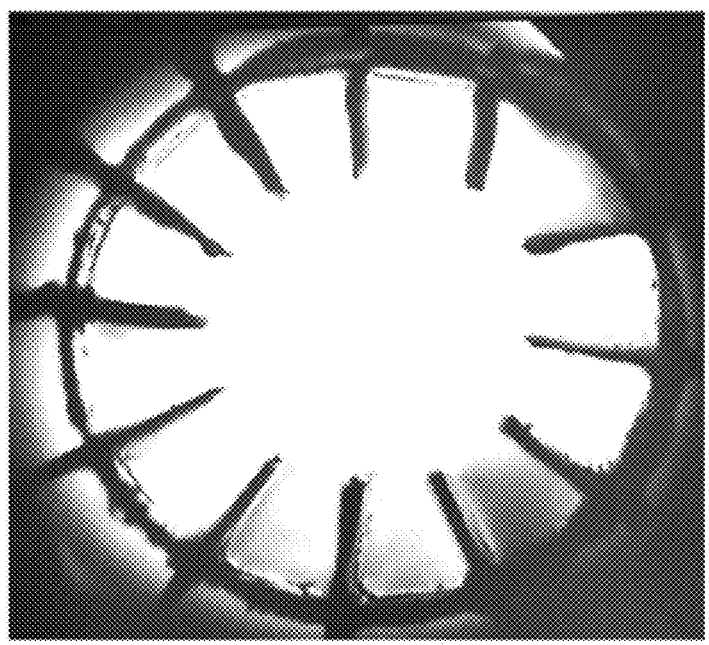
FIG. 8 depicts a cross-section of an embodiment having twelve septa.

One embodiment of the pie-shaped cross section straws tested, as shown in FIG. 7, included a larger 6-point pie shape configuration with R=2 and D=15.0 mm, which fabricated in accord with the septa forming process disclosed above. A second embodiment, a smaller 12-point pie with D=3.25 mm, shown in FIG. 8, was designed to achieve R=3, i.e., three times the boron coating of the round straw of the same diameter. Both embodiments of the detector were tested in the lab, to verify successful generation and readout of signals, and to measure the performance benefit offered by the large increase in boron coated area introduced in the septa. The straws were assembled with a central anode wire, and set up for flow-through operation. A moderated $^{252}$Cf source was placed 20 cm away from the detectors. The two detectors were compared against round cross-section straws of the same respective diameter.

Figure 9:
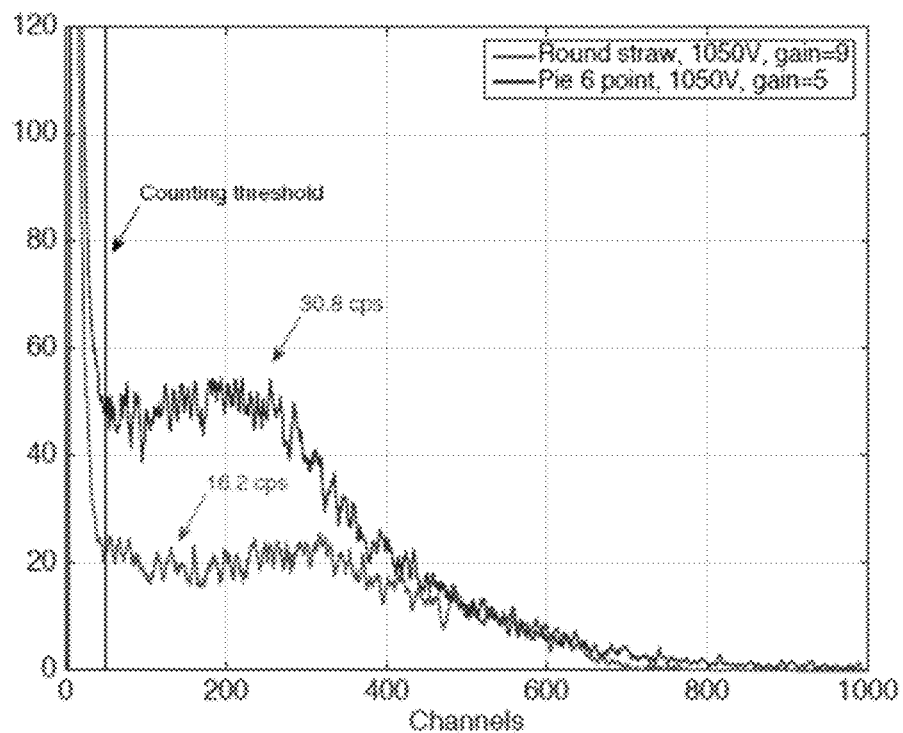
FIG. 9 depicts a graph neutron pulse height spectra collected for a six septa embodiment as compared to a prior are round cross-section straw of the same diameter.

FIG. 9 shows the pulse height spectra collected in the two larger detectors, pie-shaped (darker grey) and round straws (lighter grey) having D=15.0 mm. The two spectra are very similar, indicating that the 6 septa walls have a small effect on the signal shaping. The 6-point pie recorded 1.90 times higher count rate compared to its round counterpart, very close to the theoretical ratio of 2.0.

Figure 10:
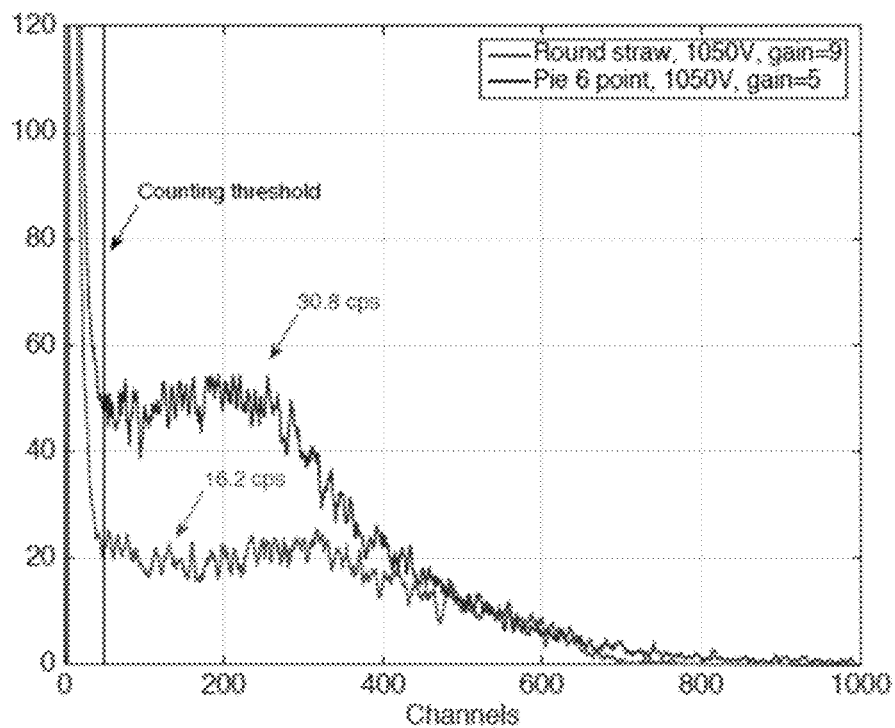
FIG. 10 depicts a graph neutron pulse height spectra collected for a twelve septa embodiment as compared to a prior are round cross-section straw of the same diameter.

FIG. 10 shows the spectra collected in the smaller pie-shaped (darker grey) and round straws (lighter grey) having D=325 mm. Here the two spectra have different shapes, undoubtedly due to signals formed in the tight space enclosed between neighboring septa; still, the pie-12 spectrum shows sufficient resolution to allow successful discrimination of gamma rays, and the resulting count rate is 2.84 times higher than that of its round counterpart.

Although the embodiments tested utilized six and twelve septa, these are non-limiting examples. A single septum can improve performance but preferably the straws include a plurality (two or more) septa, and more preferably an even number of septa are utilized to maintain symmetry such that the response of a single straw will be uniform regardless of the neutron incidence direction. As will now be recognized by those of skill in the art, the number of septa utilized in a straw detector can be varied depending upon the size of the straw, the manufacturing technique utilized, the sensitivity desired, and other factors which are apparent to those of skill in the art. As will be now be recognized, too many septa will result in low level electric field region which can form in between the septa if they are too close to one another.

Figure 13A:
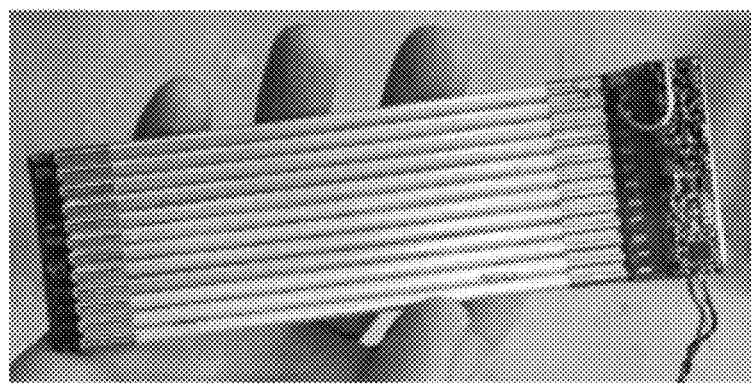
FIG. 13A depicts a panel of neutron detectors including the improved straws suitable for inclusion in a wearable neutron detection system.
Figure 13B:
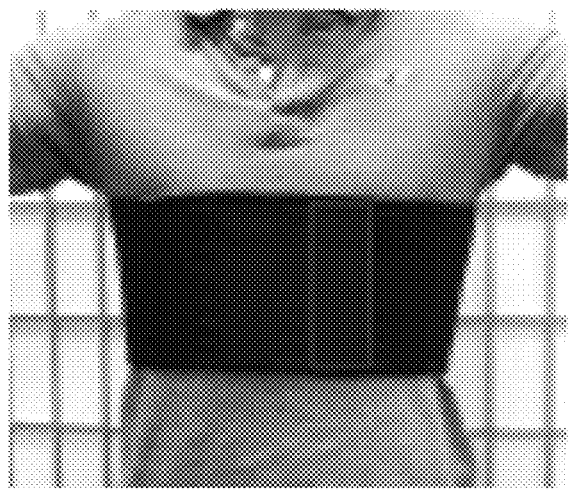
FIG. 13B depicts an embodiment of a wearable neutron detector system utilizing embodiments of straws having a pie-shaped cross-section.

As shown in FIGS. 13A and B, the improved boron-coated straw detectors of the can be formed into panels and utilized as part of a wearable neutron detector system. There is a great unmet demand for a wearable system that can be hidden under clothing that does not encumber activity. The improved straw detectors offer greater sensitivity in the same volume, compared to prior art straws of the same diameter. Utilizing embodiments of the invention, panels can be constructed providing 30% efficiency for thermal neutrons can be reduced from 1.2 cm to 0.4 cm in diameter. For example, the embodiment of FIG. 13A includes a panels of straw detectors weighing about 0.1 pounds utilizing straws having 12 septa such as have been disclosed herein. The straws can be formed into panels of about 5 cm by about 10 cm by about 0.4 cm that can be distributed over the torso in a wearable system such as is the vest shown in FIG. 13B. As used herein, the term vest is intended to include vests, bands, straps, wraps and the like that can be worn and secured around a torso. Preferably 10 to 24 panels are utilized in a wearable system. Preferably, such wearable systems utilize ultra low power electronics such as will now be recognized by those skilled in the art to include on-board HV supply, a single transistor amplifier, utilizing only about 100 µA at 3.7 V, capable of operating for 100 plus days on 300 mA/hr AAA batteries, having a layout of about 2 inches by 0.5 inches. Such ultra low power electronics are preferably mass producible without tuning. Utilizing such a wearable system allows a mere 1 pound of detectors to replace a 30-pound backpack using prior art detectors.

Figure 14:
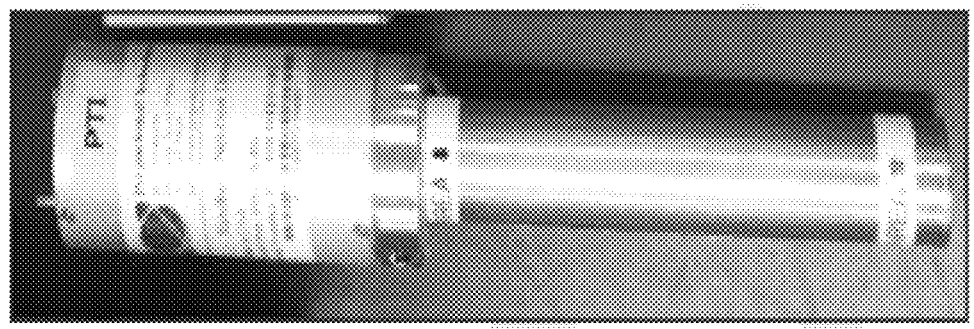
FIG. 14 depicts a small handheld detector utilizing embodiments of straws having a pie-shaped cross-section.

As shown in FIG. 14, the improved boron coated straw detectors of the present invention can also be utilized in a small handheld detector system. The embodiment disclosed in FIG. 14 is a handheld detector having about a 1" diameter containing 19 straws. This detector was tested to assess its sensitivity to a range of neutron energies, its response to gamma rays, and other metrics. A summary of the results is in the Table I below:

Experimental measurements on first generation prototypes demonstrated ~95% of the theoretically predicted gains.

While the terms used herein are believed to be well-understood by one of ordinary skill in the art, definitions are set forth to facilitate explanation of certain of the presently-disclosed subject matter.

Following long-standing patent law convention, the terms "a", "an", and "the" refer to one or more when used in this application, including the claims. Thus, for example, reference to "a window" includes a plurality of such windows, and so forth.

Unless otherwise indicated, all numbers expressing quantities of elements, dimensions such as width and area, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of a dimension, area, percentage, etc., is meant to encompass variations of in some embodiments plus or minus 20%, in some embodiments plus or minus

TABLE 1

| Efficiency Varying Neutron Fluence | | | | |
|---|---|---|---|---|
| Sources | Absolute Efficiency (%) | Absolute Efficiency Uncertainty | Intrinsic Efficiency (%) | Intrinsic Efficiency Uncertainty |
| $^{252}$Cf | 8.9706E−05 | 3.5462E−05 | 7.04E−01 | 0.28 |
| $^{252}$Cf | 1.1371E−04 | 1.8862E−05 | 8.93E−01 | 0.15 |
| $^{252}$Cf | 1.2363E−04 | 1.8713E−05 | 1.00E−00 | 0.15 |
| AmBe | 1.0059E−04 | 1.5260E−05 | 7.84E−01 | 0.12 |
| AmLi (9976) | 1.6616E−04 | 4.2602E−05 | 1.51E−00 | 0.39 |
| AmLi (9975) | 1.9727E−04 | 4.6986E−05 | 1.80E−00 | 0.43 |
| WGPu | 2.3409E−04 | 7.6719E−05 | 9.47E−01 | 0.31 |

| Efficiency with Varying Moderation | | | | | | |
|---|---|---|---|---|---|---|
| HDPE Thickness (cm) | Absolute Efficiency (%) | Absolute Efficiency Uncertainty | Intrinsic Efficiency (%) | Intrinsic Efficiency Uncertainty | FOM (Signal Noise) | FOM Uncertainty |
| 0.0 | 1.24E−04 | 1.87E−05 | 1.00 | 0.15 | 1.61E−06 | 2.43E−07 |
| 2.0 | 3.55E−04 | 5.34E−05 | 2.87 | 0.43 | 4.61E−06 | 6.94E−07 |
| 4.0 | 7.25E−04 | 1.09E−04 | 5.86 | 0.88 | 9.42E−06 | 1.41E−06 |
| 8.0 | 8.26E−04 | 1.24E−04 | 6.68 | 1.00 | 1.07E−05 | 1.61E−06 |

| Relative Angular Response | | |
|---|---|---|
| Detector Orientation | Relative Response | Relative Response Uncertainty |
| 0° | 1.00 | 0.1027 |
| 45° | 0.94 | 0.0981 |
| 90° | 1.00 | 0.1024 |
| 135° | 0.99 | 0.1018 |
| 180° | 1/10 | 0.1098 |

| Additional Measurements | |
|---|---|
| Net Instrument Response in 30 mR/h Gamma Radiation Field | 0.034 cps +/− 0.006 |
| Gamma Absolute Rejection Ratio with Neutron Source | 1.01 +/− 0.02 |
| t-Value | 6.23 µs |

Results clearly demonstrate the new pie-like cross-section straw shape is a viable solution for a more sensitive boron-coated straw technology.

10%, in some embodiments plus or minus 5%, in some embodiments plus or minus 1%, in some embodiments plus or minus 0.5%, and in some embodiments plus or minus 0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter. With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, S, C, and/or O" includes A, S, C, and O individually, but also includes any and all combinations and subcombinations of A, S, C, and O.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. The foregoing disclosure and description are illustrative and explanatory thereof, and various changes in the details of the illustrated apparatus and construction and method of operation may be made without departing from the spirit in scope of the invention which is described by the following claims.

I claim the following:

1. An improved boron-coated straw detector system comprising a boron-coated straw having a diameter and a plurality of septa extending radially inward from an inner surface of the straw, each septum having a boron-coating on two sides and a length of about 0.25 times the straw diameter or less, wherein each septum is within about 5% difference in length.

2. The straw detector system of claim 1, wherein the straw comprises an even number of septa.

3. The straw detector system of claim 1, wherein each septum extends from a first end of the straw to a second opposite end of the straw.

4. The straw detector system of claim 1, wherein the straw comprises 6 to 12 septa.

5. The straw detector system of claim 1, wherein the septa are equally spaced apart around the interior surface of the straw.

6. The straw detector system of claim 5, wherein the length of each septum is within about 5% of the length of an arc length between each septum.

7. The straw detectors system of claim 5, wherein the length of each septum is between about 50% and 100% of an arch length between each septum.

8. A neutron detection system comprising a plurality of boron-coated straws formed into a panel, each boron-coated straw in the panel having a plurality of septa extending radially inward from an inner surface of the straw, and each septum having a boron-coating on both sides, wherein each septum within a straw is within about 5% difference in length.

9. The neutron detection system of claim 8 comprising 12 boron-coated straws.

10. The neutron detection system of claim 8 wherein each straw comprises 12 septa.

11. The neutron detection system of claim 8 wherein each straw has an internal diameter of between about 3.25 mm and 15.0 mm, inclusive.

12. The neutron detection system of claim 8 further comprising a wearable vest to which the panel is attached.

13. The neutron detection system of claim 12 comprising at least ten panels.

14. The neutron detection system of claim 8 wherein at least one straw comprises an even number of septa.

15. The neutron detection s stem of claim 8 herein each septum of at least one straw extends from a first end of that straw to a second opposite end of that straw.

16. The neutron detection system of claim 8 wherein for at least one of the straws, the septa are equally paced apart around the interior of each straw.

17. The neutron detection system of claim 16 wherein the length of each septum is less than or equal to 1.9 times the length of an arc between each septum.

18. The neutron detection system of claim 17 wherein the length of each septum is greater than or equal to 0.95 times the length of an arc between each septum.

19. The neutron detection system of claim 8 wherein the ratio of the length of each septum to the length of an arc between each septum is less than or equal to the number of septa in a straw divided by $2\pi$.

20. A neutron detection system comprising a plurality of boron-coated straws formed into a panel, each boron-coated straw in the panel having a plurality of septa extending radially inward from an inner surface of the straw, and each septum having a boron-coating on both sides, wherein the panel is about 5.0 cm by 10 cm in size.

21. A neutron detection system comprising a plurality of boron-coated straws formed into a panel, each boron-coated straw in the panel having a plurality of septa extending radially inward from an inner surface of the straw and each septum having a boron-coating on both sides, wherein the panel weighs about 0.1 pounds or less.

* * * * *